R. P. PICTET.
MANUFACTURING SULPHUROUS ANHYDRIDE.
No. 191,778. Patented June 12, 1877.
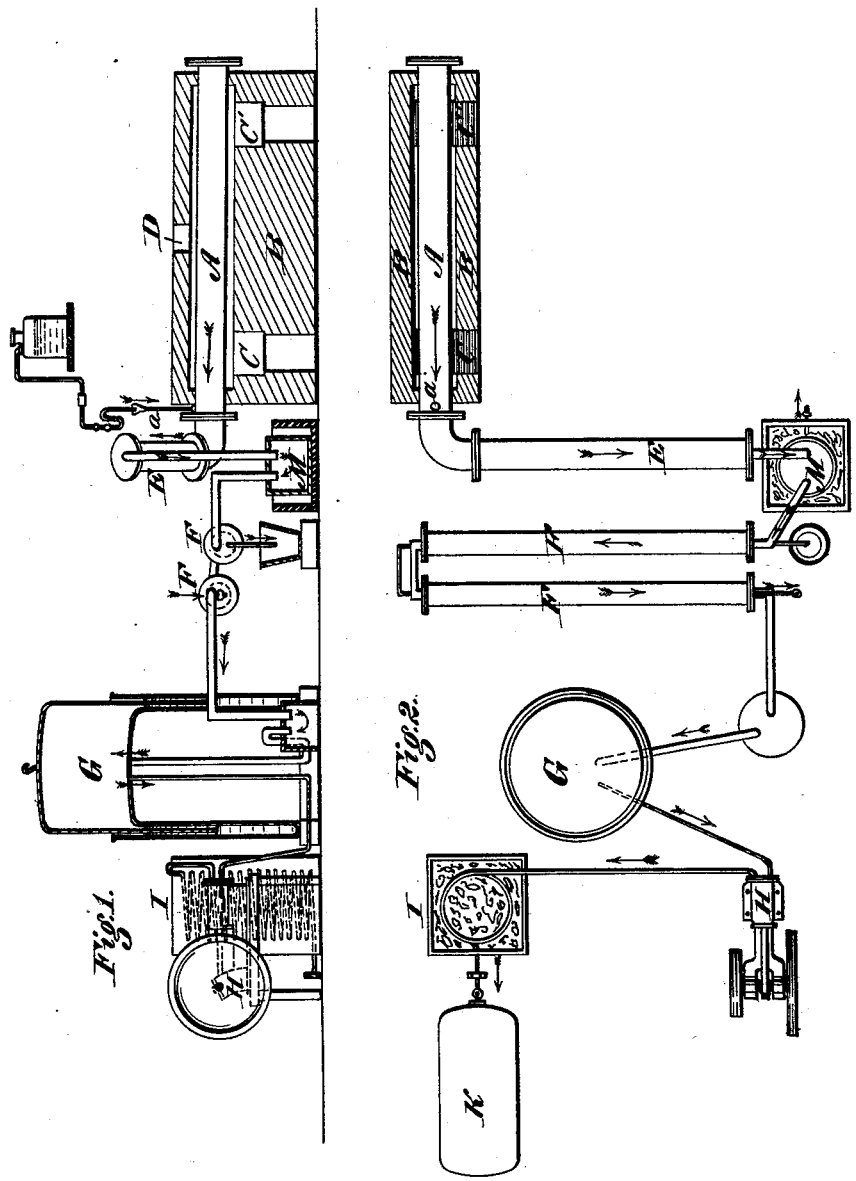

UNITED STATES PATENT OFFICE.

RAOUL P. PICTET, OF GENEVA, SWITZERLAND.

IMPROVEMENT IN MANUFACTURING SULPHUROUS ANHYDRIDE.

Specification forming part of Letters Patent No. 191,778, dated June 12, 1877; application filed March 9, 1877; patented in England, August 3, 1875, for 14 years.

*To all whom it may concern:*

Be it known that I, R. P. PICTET, of Geneva, Switzerland, have invented certain Improvements in Manufacturing Sulphurous Oxide, and rendering the same anhydrous, of which the following is a specification:

My invention relates to a novel method of manufacturing and storing sulphurous oxide and rendering the same anhydrous, whereby it is adapted for use in ice-machines and similar purposes, and to apparatus for practicing the said method, the same having been patented in Great Britain, August 3, 1875, being English Patent No. 2,727 of 1875.

The said invention consists in the successive steps of the continuous operation hereinafter particularly described and claimed, wherein gaseous sulphurous acid is formed by heating together sulphur and sulphuric acid alone, then conducting the product, immediately after its formation, successively through a cleansing medium and an anhydrating medium, whereby it is freed from all extraneous matters, including moisture, and then condensing the said purified and anhydrated gas by pressure into a fluid, and collecting and storing the same, the entire continuous operation being carried on from beginning to end with the atmosphere, and all other extraneous substances excluded from the materials while being heated, and from the gaseous sulphurous acid and the liquid sulphurous oxide during the entire operation.

It consists, also, in the devices and combination of devices herein described and claimed, whereby said method may be produced.

The said liquid product of my process or method has not the characteristics of an acid, and, having no corrosive action upon metals, it is peculiarly adapted to be successfully used as the refrigerating-agent in machines for the manufacture of ice, and other forms of refrigerating apparatus, without its attacking or otherwise producing any injurious effect upon the materials of which such machines and apparatus are composed. But the liquid condensed of vapors of heated sulphur and sulphuric acid, when containing water, has decided acid properties, so as to render it unfit for use as a refrigerating-agent in ice-machines or other similar apparatus, because of its corrosive action upon metals. While, therefore, the last-named (hydrous) fluid may be properly termed sulphurous acid, the anhydrous fluid made by my process cannot be properly denominated an acid at all. I therefore denominate this anhydrous fluid sulphurous anhydrous oxide, ($SO_2$.)

To accomplish this result I build a furnace, B, and place therein a cast-iron retort, A, as shown in plan in Fig. 2, the latter being partly in section, also. This furnace is provided with two fire-chambers, C and C', and a chimney, D, for conducting away the products of combustion, which chimney may be located at any convenient point.

In the retort A I introduce either sulphurous vapors or a substance capable of giving off vapors of sulphur. For this purpose I prefer to use sulphur, either in flour or sticks, the quantity, of course, depending on the size of the retort. A small stream of commercial sulphuric acid is then introduced into the retort through a safety-tube, $a$, at the top of the retort, at its highest end. As the acid flows along the retort it is volatilized by the heat of the furnace C', and its vapors, by reason of its high temperature, take along with it the vapor of sulphur. This mixture of vapors passes along the retort, and in passing the furnace C attains a temperature of at least 300° centigrade. A decomposition takes place, the sulphuric acid ($SO_3$) losing an equivalent of oxygen, which combines with the sulphur and forms sulphurous acid, ($SO_2$,) and becomes also itself sulphurous acid, ($SO_2$.) In this reaction about five parts of sulphuric acid of commerce of 66°, and about one part of sulphur, are required to produce six parts of sulphurous acid.

In order to cleanse the gaseous product ($SO_2$) as it leaves the retort from particles of sulphur held in suspension, it is caused to ascend an inclined pipe, E, where it deposits the undecomposed sulphur or sulphuric acid, which returns to the retort.

In order to render the gas thus formed anhydrous as it leaves the cleansing medium, it is made to pass over any suitable hygrometric substance, such as chloride of calcium, chloride of sodium, &c.; but, as cheaper, I prefer to pass it over a stream of sulphuric acid, which may be done by means of slightly-inclined tubes F F, as represented in the drawings. The sulphuric acid, entering at one end, coming out at the other, absorbs in its course all the vapor of water from the gas. The gas is then collected in a gasometer, G, from which it is withdrawn by a pump, H, and compressed through a worm or coil, I, surrounded with ice or submerged in any cold bath, by which it is condensed into a liquid form. As it flows from the coil or worm it is conducted into copper vessels K, provided with a tight top, and in this condition it is stored and kept ready for conveyance or use wherever and whenever desired.

As represented in the drawings, the gas may be passed through a vessel, M, surrounded with ice, as it leaves the inclined tube E, and before entering the washing-tubes F, for the purpose of condensing the greater part of the water which it contains, although this is not absolutely necessary. By these means I am able to produce a fluid that is pure and perfectly free from moisture—a true anhydrous sulphurous oxide. In this form it is specially adapted to be used in machines for artificial refrigeration, it not having any injurious effect upon the metal of the apparatus in which it is used, and even acting as a lubricant, so dispensing with the grease ordinarily used for lubrication in ice-machines.

I do not claim as of my invention the production of sulphurous acid by the union of sulphuric acid with sulphur with the application of heat, as that has long been known and practiced; but, as hereinbefore stated, the material thus prepared is an acid, and for that reason is not adapted to be successfully used in ice-machines and the like. Neither do I claim as my invention the condensation of the gas by pressure, as that is also well known; but I am not aware that any one has ever before devised any method or apparatus by which sulphurous anhydrous oxide could be produced on a commercial scale, and in a condition suitable for successful use in an ice-machine.

Having thus described my invention, what I claim is—

1. The herein-described method or process of producing and storing fluid sulphurous oxide, and rendering the same pure and anhydrous—that is to say, by heating together sulphur and sulphuric acid alone, and then immediately passing the product successively through a cleansing medium and an anhydrating medium, whereby it is freed from all extraneous matters, including water and the vapor of water, and then immediately condensing the said gas, by pressure, into a fluid, and collecting and storing the same, the entire continuous operation from the beginning to the end being carried on with the atmosphere, and all other extraneous substances excluded from contact with the materials used, and from the resulting gas and fluid, all substantially as described.

2. The apparatus described for making, purifying, anhydrating, and storing sulphurous oxide, consisting of the heating-retort A, the vessel and pipes for holding and delivering into the retort sulphuric acid, without the admission of atmospheric air, the discharge-pipe E, the inclined pipes F F, the gasometer G, the pump H, the refrigerator I, and the fluid-holder K, with the pipes connecting the several named parts, all constructed and combined to operate substantially as and for the purpose set forth.

RAOUL PIERRE PICTET.

Witnesses:
CHAS. H. UPTON,
ALBERT TUNETTINI.